United States Patent [19]

King

[11] Patent Number: 4,718,816

[45] Date of Patent: Jan. 12, 1988

[54] LOAD HANDLING ATTACHMENT FOR VEHICLES

[76] Inventor: Carl M. King, 1629 NW. 113th Ave., Portland, Oreg. 97201

[21] Appl. No.: 864,541

[22] Filed: May 19, 1986

[51] Int. Cl.$^4$ .............................................. B66C 3/00
[52] U.S. Cl. ...................................... 414/739; 414/23; 414/607
[58] Field of Search ............... 414/697, 703, 705, 715, 414/717, 718, 738, 739, 620, 741, 619, 626, 23, 607, 24.5; 294/119.1, 106, 902

[56] References Cited

U.S. PATENT DOCUMENTS

| | | | |
|---|---|---|---|
| 2,448,124 | 8/1948 | Roy | 414/738 X |
| 2,576,660 | 11/1951 | Williams | 414/620 X |
| 2,683,546 | 7/1954 | Sherriff | 294/902 X |
| 2,827,189 | 3/1958 | Knudstrup | 414/607 |
| 3,163,944 | 1/1965 | Whitcomb | 37/2 R |
| 3,198,568 | 8/1965 | Mindrum | 414/619 X |
| 3,311,350 | 3/1967 | Irwin | 254/132 |
| 3,318,629 | 5/1967 | Brandt, Jr. | 294/902 X |
| 3,319,815 | 5/1967 | Vik | 414/607 |
| 3,410,431 | 11/1968 | Vik | 414/607 |
| 3,426,929 | 2/1969 | Vik | 414/739 X |
| 3,438,523 | 4/1969 | Vik | 414/607 X |
| 3,512,670 | 5/1970 | Howard | 414/607 |
| 3,881,615 | 5/1975 | Albright | 414/739 X |
| 3,899,094 | 8/1975 | Youl | 414/739 |
| 3,904,232 | 9/1975 | Byles | 414/739 X |
| 3,911,981 | 10/1975 | Tucek | 414/739 X |
| 4,177,000 | 12/1979 | Weinert et al. | 414/620 |
| 4,209,280 | 6/1980 | Bittner | 414/620 |
| 4,212,577 | 7/1980 | Swanson | 414/23 |
| 4,214,840 | 7/1980 | Beales | 414/723 X |
| 4,315,652 | 2/1982 | Barwise | 414/739 X |
| 4,340,333 | 7/1982 | Cashio | 414/607 |
| 4,516,905 | 5/1985 | Gavin | 414/620 |
| 4,570,431 | 2/1986 | Igel | 294/902 X |
| 4,573,858 | 3/1986 | Sinclair | 414/620 |

FOREIGN PATENT DOCUMENTS 2369995  6/1978  France .

Primary Examiner—Robert J. Spar
Assistant Examiner—Jennifer Doyle
Attorney, Agent, or Firm—Eugene M. Eckelman

[57] ABSTRACT

A rigid main frame has top and bottom frame members and upright connecting frame members. A pair of support arms have an inner end thereof pivotally supported on the bottom frame member and these arms are driven by powered cylinders connected to the main frame. The arms are supported from above by tension support members. The support arms have opposed load engaging pads on the outer ends thereof arranged to engage a load from opposite directions. The support arms and load engaging pads have a convex-concave configuration for efficient lifting relationship with a load. The load engaging pads have stem attachment to the support arms and such stems have length adjustable support in the support arms for providing a selected spacing of the pads from the arms.

4 Claims, 4 Drawing Figures

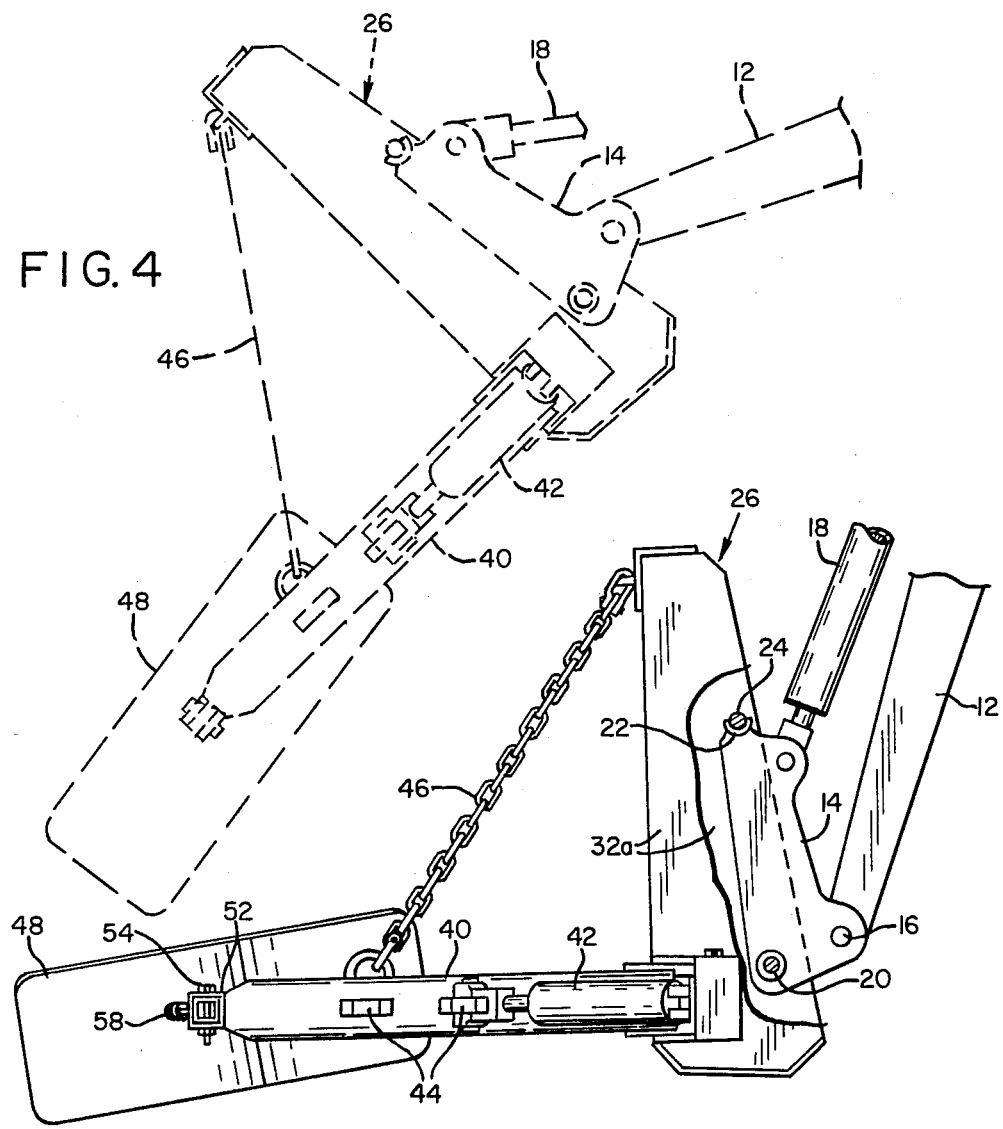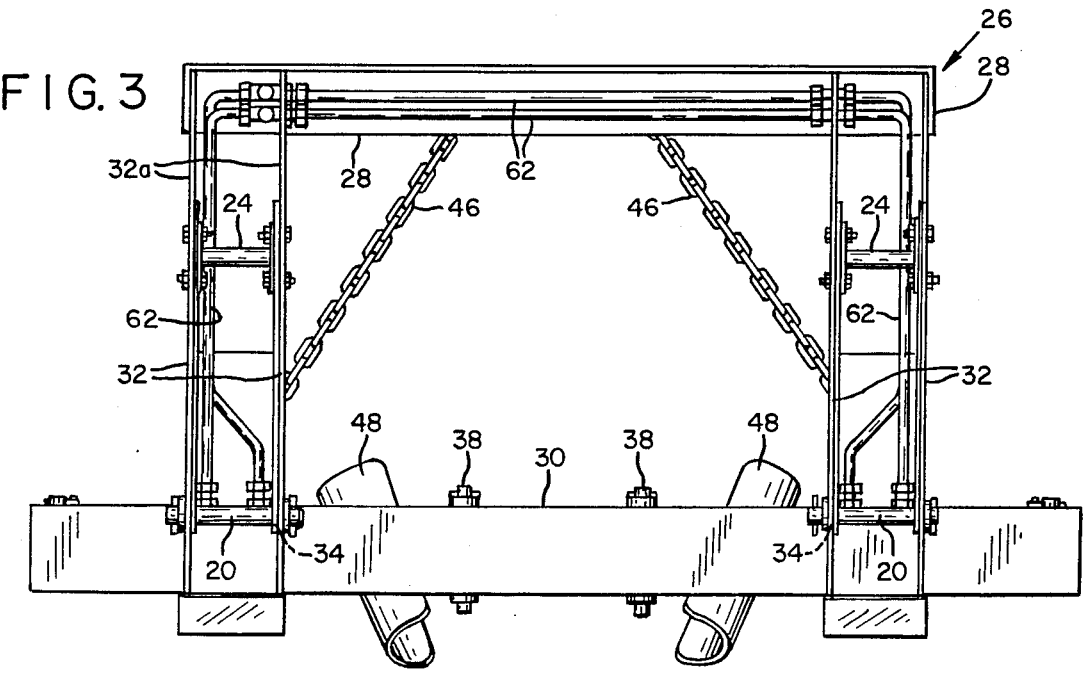

LOAD HANDLING ATTACHMENT FOR VEHICLES

BACKGROUND OF THE INVENTION

This invention relates to new and useful improvements in load handling attachments for vehicles such as tractors.

Various types of handling attachments have heretofore been devised for handling specific loads, including the balled root portions of small trees. Prior devices for this latter purpose are known which utilize clamping forks arranged to engage the balled portion of the trees, but such fork-like devices are not satisfactory in their use. That is, the fork-type arm, when clamping the ball portion of the tree, often penetrates the roots and causes damage to the tree and/or the covering material for the roots. In addition, fork-like arms do not hold the tree in a stable upright position, whereby the trunk of the tree can sometimes pivot on the clamp arms and the tree allowed to touch the ground or tilt against the tractor which damages the bark. U.S. Pat. No. 3,163,944 shows apparatus for digging and balling bushes or trees but such structure does not contain means capable of efficiently and safely grasping the balled portion of trees and maneuvering it out of a dug hole and onto transporting vehicles. Other U.S. patents have been granted for load handling devices, such as U.S. Pat. Nos. 3,311,350, 4,177,000, 4,209,280, 4,212,577, 4,340,333, 4,516,905, and 4,573,858, but likewise the structures as shown in these patents, while serving their own purposes, could not efficiently and safely handle a balled tree.

SUMMARY OF THE INVENTION

According to the present invention and forming a primary objective thereof, an improved load handling attachment is provided which is arranged to be mounted on a vehicle of the type having a support portion movable vertically by a powered boom and rotatable on a transverse horizontal axis, the attachment of the invention utilizing a novel arrangement of support frame and support arms which provide an efficient and safe structure for handling loads such as balled trees.

Another object of the invention is to provide an attachment of the type described having a frame capable of quick attachment to and detachment from existing drive output means of tractors and the like.

A further object of the invention is to provide an attachment of the type described having a novel arrangement of clamp arms which are adjustable for accommodating different sizes of trees.

In carrying out the above objectives, the invention has a rigid main frame comprising top and bottom horizontal frame members with connecting upright frame members therebetween. This main frame has attaching means arranged to readily and removably attach it to the drive output means of a tractor or the like. A pair of support arms extend forwardly from the main frame and have an outer free end with widened engaging pads thereon arranged to engage opposite sides of a load by operation of power means for the support arms such as hydraulic cylinders. Tension support means, such as chains, are connected between an upper portion of the main frame and and outer portion of the arms to provide support for the arms and a load to be handled. The support arms have a convex-concave curvature with the concave portions facing each other to provide an enlarged clearance area for a load. The load engaging pads also have a convex-concave curvature and in addition have integral stem portions adjustable lengthwise on the support arms for providing a selected spacing of the pads from their arms.

The invention will be better understood and additional objects and advantages will become apparent from the following description taken in connection with the accompanying drawings.

BRIEF DESCRIPTION OF THE DRAWINGS

FIG. 3 is a rear elevational view thereof; and

FIG. 4 shows in full and broken lines some of the operating positions which are possible with the present attachment when mounted on a tractor.

DETAILED DESCRIPTION OF A PREFERRED EMBODIMENT

Figure 1:
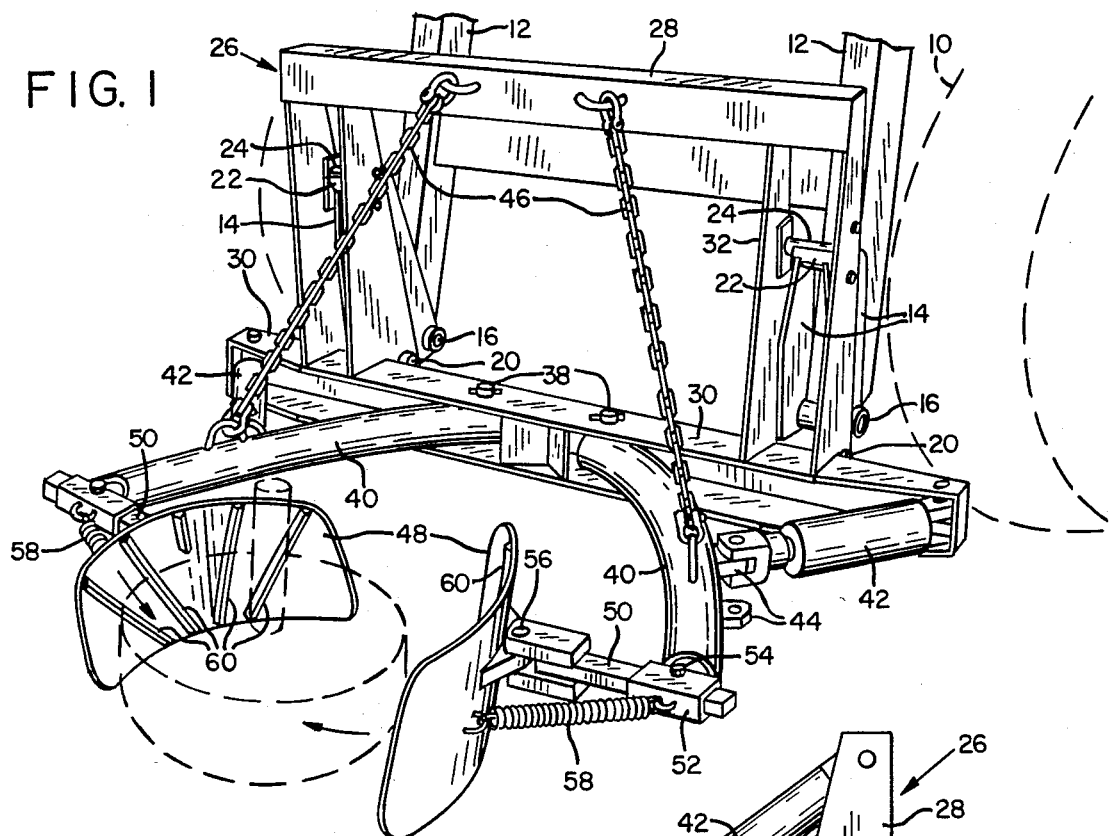
FIG. 1 is a perspective view of the present load handling attachment mounted on a tractor.

With particular reference to the drawings, the present invention is arranged for releasable attachment to a vehicle 10, such as a tractor, FIG. 1, having the usual power operated mechanism such as boom operated members 12 arranged for up and down movement on a transverse horizontal axis and having an adapter 14 pivotally connected to the end thereof by pivot means 16. The boom has powered pivoting means 18 for the adapter, such as one or more hydraulic cylinders, pivotally connected to the upper end of the adapter 14. By means of this tractor drive output, the adapter 14 is arranged to be lifted up and down with the boom and also pivoted on the horizontal transverse axis 16. The lower forward portion of the adapters 14 has removable pin means 20 for connection to various attachments, including the present attachment, and these adapters also have a top cupped portion 22 removably engageable with cross pins 24 integral with the attachments. It is with these tractor connections and movements therewith that the present attachment is constructed to efficiently and safely handle loads, as will now be described. A particular use of the attachment is to handle balled trees but it is to be understood that it can be used for other purposes as well.

The present attachment comprises a rigid main frame 26 having a horizontal top frame member 28, a bottom horizontal front opening, channel-shaped frame member 30, and interconnecting upright frame members 32. Each of the upright connecting frame members 32 comprises a pair of heavy duty plates 32a laterally spaced from each other and having lower transverse apertures 34, FIG. 3, for connection to the support pin 20 of the adapter and also having the necessary upper pin 24 as noted for engagement by the cupped connector 22 at the top of the adapter 14. The present structure provides ready releasable connection to the adapter 14 merely by manipulating the boom 12 to engage the cupped connector 22 on the adapter with the pin 24 and then installing the pin 20 of the adapter in the apertures 34 of the attachment. By this arrangement, the frame 26 is movable up and down with the boom 12 and also is rotatable on a transverse horizontal axis.

The bottom frame member 30 of the support frame 26 is open at the front and receives, adjacent the center thereof, pivot mounts 38 for a pair of support arms 40 having a power drive toward each other by hydraulic cylinders 42 pivotally connected between the rear of the arms and an outer end portion of the bottom frame member 38. In a preferred structure, the hydraulic cylinders 42 are two-way cylinders connected between the arms and the frame member 30. Such cylinders are connected to the arms 40 by ears 44 on the latter, two or more of these ears being spaced along the arms for selected attachment thereto of the cylinders. Support arms 40 have a convex-concave configuration, with the concave portions thereof facing each other. These arms have load reinforcement from the top by chains 46 or other suitable flexible members angling from the arms up to top frame members 28 and connected to the latter at points substantially vertically above their respective pivot points 38.

The outer ends of the arms 40 support respective load engaging pads 48 of identical structure. These pads are integrated with rearwardly extending stems 50 which are mounted in obliquely extending sockets 52 on the outer ends of the arms 40. The stems 50 have adjustable connection through their length to the arms by pins 54 mounted in the sockets. Pads 48 have a vertical axis pivotal support 56 on the ends of stems 50 and are biased to a front open position by tension springs 58 connected between the rear of the pads forward of the pivot and a portion of the support arms such as the sockets 52.

The load engaging pads, similar to the support arms 40, have opposing concave configurations and importantly have a concave configuration and vertical dimension which allows them to clamp against the side of a tree ball without damaging the ball and also holding the ball steady with the stem of the tree upright. A vertical dimension of the pads preferably is at least 11 inches to achieve efficient clamping engagement with a tree ball. These pads also have a sufficient length to partially wrap around the ball, such as from 18 inches to 2 feet. These dimensions may vary, however, according to load requirements and interchangeability of the pads is readily accomplished by releasable connection from the sockets 52 or from the pivots 56. The concaved configuration of the pads 48 as well as the concaved configuration of the clamp arms 40 efficiently wrap around and engage a tree ball. In a preferred structure, the load engaging faces of the pads 48 have ribs 60 thereon to increase the frictional engagement with a tree. Also the pads are tipped outwardly a slight amount from bottom to top, such as about 15 degrees, to form a cup-like support.

The portions 28, 30 and 32 making up main frame 26 have internal areas to provide a protective area for hydraulic conduit 62 for the cylinders, FIG. 3.

Figure 2:
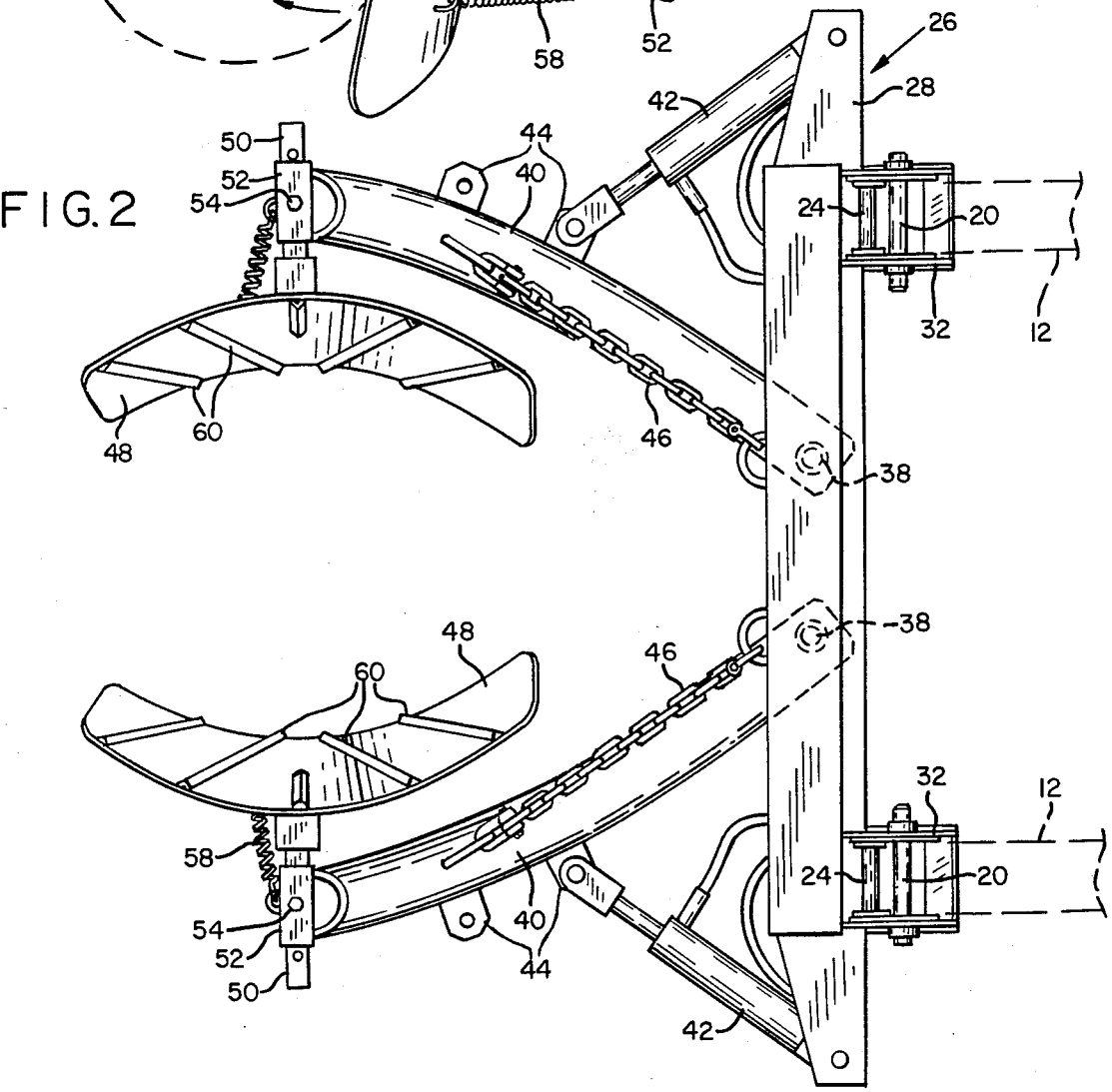
FIG. 2 is a top plan view of the attachment.

According to the present invention, a load handling attachment is provided that is readily attachable to and detachable from a conventional tractor having a powered boom thereon. By suitable manipulation of the tractor, the pads 48 can be engaged with opposite sides of the ball of a tree and the tree lifted and manipulated as desired. The clamping engagement and other manipulation may require up and down movement of the frame or tilting thereof on a transverse axis, and the present frame provides the structure which allows such drive movement by the tractor. For example, the attachment can be worked in substantially a horizontal position as illustrated in full lines in FIG. 4, or it can be turned to point downwardly as shown in the broken lines of FIG. 4. This latter position is useful for picking up balled trees from a position in a dug hole. Also, the attachment can be pointed upwardly if desired. Furthermore, it can be raised to a desired elevation for loading the tree and of course otherwise rotated on the pivots 20 as necessary. Preferably, the pads 48 are tilted down slightly toward the front relative to the arms 40, as shown in FIG. 4, so that the tree trunk will angle away from the frame 26. Adjustment of the stems in the sockets 52 may be made to suit load requirements, FIGS. 1 and 2 showing different settings of these stems.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A handling attachment for balled trees arranged to be mounted on a vehicle of the type having a support portion movable vertically by powered boom means and rotatable on a transverse horizontal axis by power drive means on the boom means, said attachment comprising:

a rigid main frame having top and bottom horizontal frame members with opposite ends, upright frame members secured between said top and bottom frame members adjacent the ends thereof, attaching means on said main frame arranged to attach it to a support portion of a vehicle, a pair of support arms extending forwardly from said bottom frame member and each having an inner end pivotally supported at a central portion on said bottom frame member and also having an outer free end, power means pivotally connected between said main frame and said support arms arranged to pivotally drive said arms toward each other, a pair of support lines secured one each between said top frame member and an outer portion of said respective arms, said support lines being secured to said top frame member in vertical alignment above the respective pivot supports of said arms, opposed load engaging pads having a vertical axis pivot support on the outer ends of said support arms arranged to engage the ball of a balled tree from opposite directions upon powered movement of said arms toward each other and provide a lifting grip on the ball, said load engaging pads having front and rearward ends and a convex-concave curvature from front to rear with said concave portions facing each other and comprising ball engaging surfaces, said ball engaging pads being tipped outwardly from bottom to top to form a cup-like support for the ball of a balled tree, and resilient means resiliently holding said pads normally in an open pivotal position toward the front for receiving a ball, said resilient means being arranged to be overcome by the clamping force of said arms whereby said pads pivot to the shape of the ball when gripping the latter.

2. The load handling attachment of claim 1 wherein said support arms have a convex-concave curvature with said concave portions facing each other to provide an enlarged clearance area for lifting articles, and including at least two releasable connector means spaced along said arms for selected connection thereto of said power means.

3. The load handling attachment of claim 2 wherein said load engaging pads are supported on stem means secured thereto on the side opposite from said load engaging surface, said stem means having secured length adjusted positions on said support arms for providing a selected spacing of said pads from each other.

4. The load handling attachment of claim 1 wherein said upright frame members each comprises a pair of sturdy plates disposed in laterally spaced relation, said attaching means being secured between respective pairs of said plates, said bottom frame member comprising a horizontal, front opening, channel-shaped structure, said support arms and power means having a pivot connection in said channel-shaped bottom frame member.

* * * * *